US008819663B2

(12) United States Patent
Goel et al.

(10) Patent No.: US 8,819,663 B2
(45) Date of Patent: Aug. 26, 2014

(54) ACCELERATION OF SOFTWARE MODIFICATIONS IN NETWORKED DEVICES

(75) Inventors: Ankit Goel, Bangalore (IN); Manjusha Gopakumar, Bangalore (IN); Abhijit Aphale, Pune (IN)

(73) Assignee: LSI Corporation, San Jose, CA (US)

( * ) Notice: Subject to any disclaimer, the term of this patent is extended or adjusted under 35 U.S.C. 154(b) by 143 days.

(21) Appl. No.: 13/526,351

(22) Filed: Jun. 18, 2012

(65) Prior Publication Data
US 2013/0339940 A1  Dec. 19, 2013

(51) Int. Cl.
*G06F 9/44* (2006.01)

(52) U.S. Cl.
USPC ........... 717/168; 717/169; 717/171; 717/172; 709/201; 709/218

(58) Field of Classification Search
CPC combination set(s) only.
See application file for complete search history.

(56) References Cited

U.S. PATENT DOCUMENTS

| | | | | |
|---|---|---|---|---|
| 5,253,161 | A * | 10/1993 | Nemirovsky et al. | 709/241 |
| 5,392,412 | A * | 2/1995 | McKenna | 710/52 |
| 6,065,045 | A * | 5/2000 | Bonham | 709/213 |
| 6,094,672 | A * | 7/2000 | Willie et al. | 709/202 |
| 6,922,831 | B1 * | 7/2005 | Kroening et al. | 717/172 |
| 7,035,952 | B2 | 4/2006 | Elliott et al. | |
| 7,062,765 | B1 * | 6/2006 | Pitzel et al. | 717/177 |
| 7,290,066 | B2 | 10/2007 | Voorhees et al. | |
| 7,373,442 | B2 | 5/2008 | Seto | |
| 7,574,630 | B1 | 8/2009 | Ranaweera et al. | |
| 7,644,168 | B2 | 1/2010 | Grieff et al. | |
| 7,747,788 | B2 | 6/2010 | Chang et al. | |
| 7,962,899 | B2 * | 6/2011 | Thompson et al. | 717/127 |
| 8,321,858 | B1 * | 11/2012 | Marmaros et al. | 717/173 |
| 2003/0154236 | A1 * | 8/2003 | Dar et al. | 709/201 |
| 2003/0195968 | A1 * | 10/2003 | Selgas et al. | 709/228 |
| 2004/0031029 | A1 * | 2/2004 | Lee et al. | 717/171 |
| 2004/0216143 | A1 | 10/2004 | Boecker et al. | |
| 2005/0125574 | A1 | 6/2005 | Foster et al. | |
| 2005/0216559 | A1 * | 9/2005 | Manion et al. | 709/205 |
| 2005/0235072 | A1 | 10/2005 | Smith et al. | |
| 2007/0168571 | A1 | 7/2007 | Ramsey et al. | |
| 2007/0226343 | A1 * | 9/2007 | Bishop | 709/226 |
| 2008/0134165 | A1 * | 6/2008 | Anderson et al. | 717/173 |
| 2008/0313282 | A1 * | 12/2008 | Warila et al. | 709/206 |
| 2009/0007135 | A1 * | 1/2009 | Rathunde et al. | 718/107 |
| 2009/0037555 | A1 | 2/2009 | Ueno et al. | |
| 2010/0023582 | A1 * | 1/2010 | Pedersen et al. | 709/203 |
| 2010/0058322 | A1 | 3/2010 | Oikawa et al. | |
| 2010/0132042 | A1 * | 5/2010 | Zhang | 726/24 |
| 2011/0219158 | A1 | 9/2011 | Davis et al. | |

* cited by examiner

*Primary Examiner* — Chameli Das
(74) *Attorney, Agent, or Firm* — Otterstedt, Ellenbogen & Kammer, LLP

(57) ABSTRACT

A method of modifying software associated with network devices includes transmitting a modification message by a first network device in response to software associated with the first network device being modified; transmitting second software identification information by a second network device in response to receiving the modification message from the first network device; providing a database comprising the first product identifier, the second product identifier, first software identification information, and the second software identification information; and modifying software associated with the second network device using the database. The first network device is associated with a first product identifier, and the second network device is associated with a second product identifier. The second software identification information identifies software associated with the second network device, and the first software identification information identifies software associated with the first network device. A corresponding computer-readable medium and system are also disclosed.

18 Claims, 11 Drawing Sheets

ACCELERATION OF SOFTWARE MODIFICATIONS IN NETWORKED DEVICES

BACKGROUND

Complex network and storage systems, such as, for example, serial attached small computer interface (SAS), are used for moving blocks of data between host computers and/or storage devices in a high performance, enterprise class environment. In the context of storage, a benefit to using an SAS system is that a large number of devices can be added to a domain (i.e., a group of devices that can communicate). Additionally, SAS and SATA (serial advanced technology attachment) drives can be combined to form a storage system which provides benefits of each type of drive.

For connectivity and compatibility purposes, a complex network or storage system often includes multiple expander devices (or expanders) to facilitate connectivity of a large number of end devices. All of the expander devices in such a system are generally required to employ the same firmware revision for ensuring connectivity and compatibility. In a large topology involving hundreds of drives and redundant input/output paths, the number of expander devices is large, and ensuring that the expander devices are operating with the same firmware version can be quite arduous.

Expander devices in the same network generally operate with the same firmware version at any given time. However, conventional techniques do not provide a streamlined approach to upgrading firmware associated with additional expanders in a network in response to an upgrade of firmware associated with a single expander in the network. Rather, a network administrator must individually upgrade firmware on one or more devices using existing management applications, which are at best cumbersome. Moreover, large network topologies often include hundreds of disk drives, redundant input/output paths, and large quantities of expanders, each of which renders individual firmware modifications to these devices very time consuming and impractical. Increases in the amount of time used to complete firmware upgrades becomes even more critical in large data centers that service enormous quantities of users in which system down-time for maintenance is critically limited.

SUMMARY

Embodiments of the invention include methods, systems, and computer-readable media to increase the speed and automation of performing software modifications associated with wired and wireless computer networks, such as, but not limited to, firmware version updates. In this manner, aspects of these embodiments reduce the time and manpower required to modify software in computer networks.

In accordance with one embodiment of the invention, a method of modifying software associated with network devices includes transmitting a modification message by a first network device in response to software associated with the first network device being modified; transmitting second software identification information by a second network device in response to receiving the modification message from the first network device; providing a database comprising the first product identifier, the second product identifier, first software identification information, and the second software identification information; and modifying software associated with the second network device using the database. The first network device is associated with a first product identifier, and the second network device is associated with a second product identifier. The second software identification information identifies software associated with the second network device, and the first software identification information identifies software associated with the first network device.

In accordance with other embodiments of the invention, a corresponding computer-readable medium and system are also provided.

Embodiments of the invention will become apparent from the following detailed description, which is to be read in connection with the accompanying drawings.

BRIEF DESCRIPTION OF THE DRAWINGS

The following drawings are presented by way of example only and without limitation, wherein like reference numerals, when used, indicate corresponding elements throughout the several views, and wherein.

Figure 1:
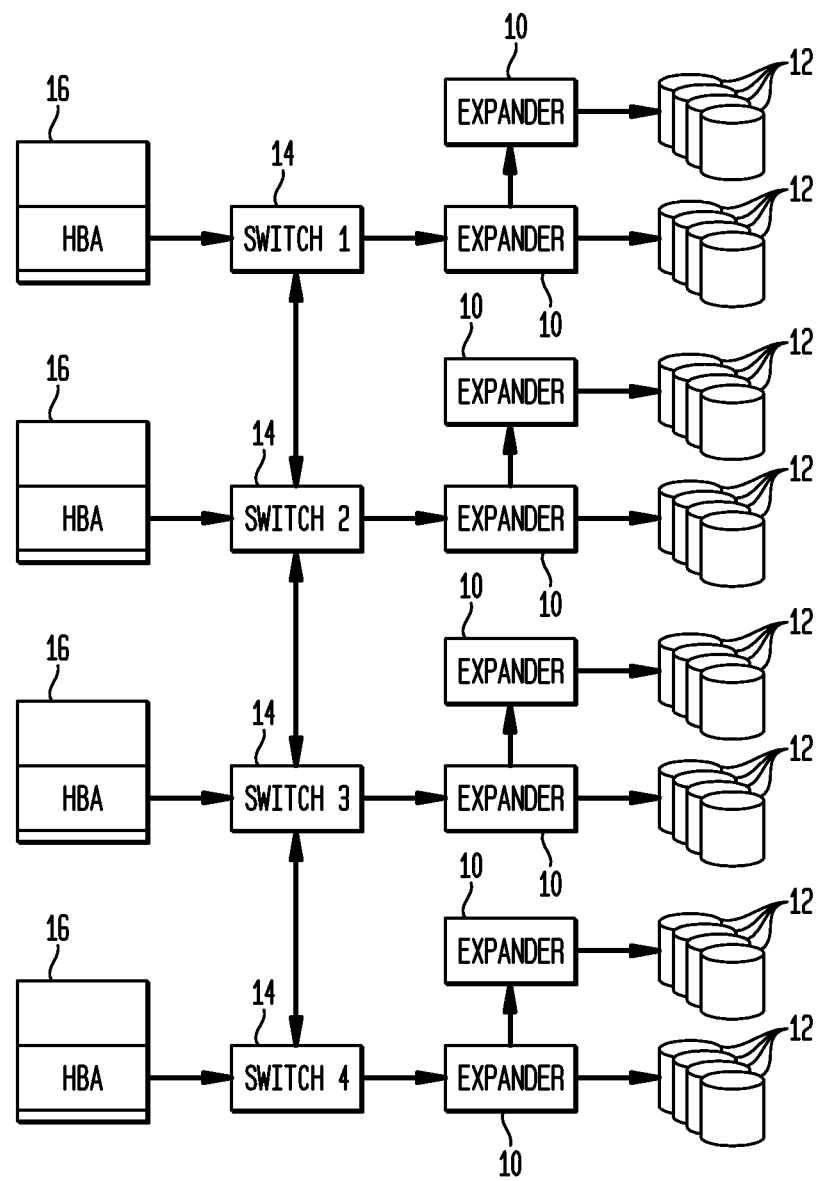
FIG. 1 is a block diagram of a first embodiment of a network incorporating expanders and 32 disk drives.

It is to be appreciated that elements in the figures are illustrated for simplicity and clarity. Common but well-understood elements that are useful in a commercially feasible embodiment are not necessarily shown in order to facilitate a less hindered view of the illustrated embodiments.

DETAILED DESCRIPTION

Embodiments of the invention are beneficial for modifying software in devices associated with a computer network, which results in substantial reductions in user intervention and network down-time. The embodiments of the invention will be described herein in the context of devices, methods, systems, and computer-readable media that increase the speed of performing system-wide software modifications of wired and wireless computer networks, when compared with conventional techniques, while reducing the amount of human intervention required to perform such software modifications. It should be understood, however, that the embodiments herein are not limited to these or any other particular devices, methods, systems, and computer-readable media. Rather, embodiments of the invention are more generally applicable to techniques for increasing the speed and automation of upgrading, downgrading, modifying, and/or providing uniformity or standardization of software throughout computer networks.

As stated above, data storage systems often incorporate multiple expander devices to facilitate connectivity and compatibility among a large quantity of intermediary and end devices. Expanders are essentially devices that enhance the capabilities of storage delivery sub-systems, and enable an increase in the quantity of serial attached small computer interface (SAS) and/or serial advanced technology attachment (SATA) devices connected to an SAS host bus adapter (HBA). Expanders are managed by a network host using serial management protocol (SMP), which represents a subset of SAS protocol. While embodiments of the invention are described herein with reference to an SMP protocol and an SAS interface, it is to be understood that the invention is not limited to use with any specific protocol or interface, but that other suitable protocols (e.g., serial SCSI protocol (SSP), SATA tunnel protocol (STP, etc.) and network interfaces may be similarly employed.

SAS is a point-to-point architecture that uses a disk controller or HBA with four or more channels operating simultaneously. Each full-duplex channel, which is also referred to as an SAS port, transfers data at 3 or 6 Gbps in each direction. SAS also supports SATA drives, which can be mixed with SAS drives in a variety of configurations, and is an interface for hard disks and optical disks. According to prescribed specifications, SATA transfers data at a rate of 1.5 Gbps in each direction, SATA II transfers data at 3 Gbps, and SATA III transfers data at 6 Gbps.

Intermediary devices represent equipment that connects individual hosts, such as, for example, switches, modems, routers, and firewalls in a network. End devices represent equipment that is either a source or destination of a network communication, such as, but not limited to, controller cards, hard disk drives, storage enclosures, computers (such as workstations, laptops, and servers connected to the network), network printers, voice-over-Internet protocol phones, cameras (such as web cams and security cameras), and the like.

Figure 2:
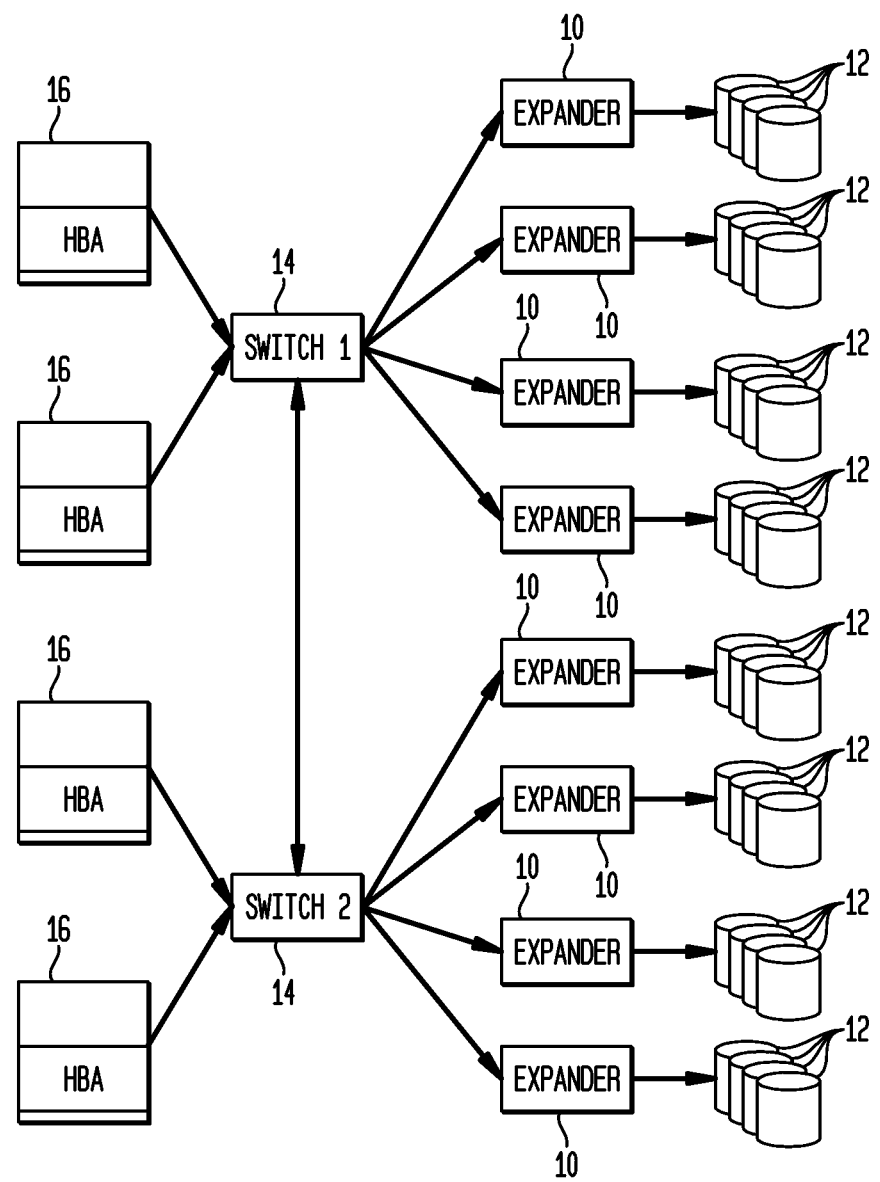
FIG. 2 is a block diagram of a second embodiment of a network incorporating expanders and 32 disk drives.

FIGS. 1-8 show various topologies in which expanders are connected to host and end devices. Specifically, FIG. 1 is a block diagram showing at least a portion of an exemplary network including expanders 10 and disk drives 12, according to a first embodiment of the invention. FIG. 2 is a block diagram depicting at least a portion of an exemplary network including expanders 10 and 32 disk drives 12, which utilizes different connectivity in upstream devices and include switches 14 and HBAs 16, according to a second embodiment of the invention.

Figure 3:
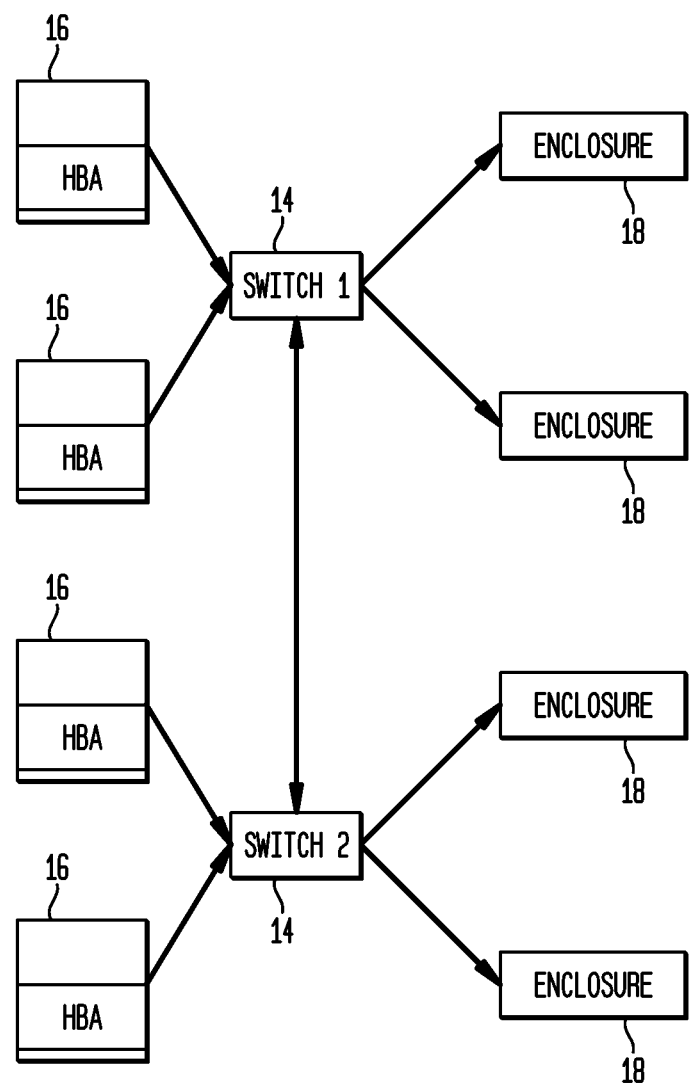
FIG. 3 is a block diagram of a third embodiment of a network incorporating enclosures with built-in expanders and 100 disk drives.
Figure 4:
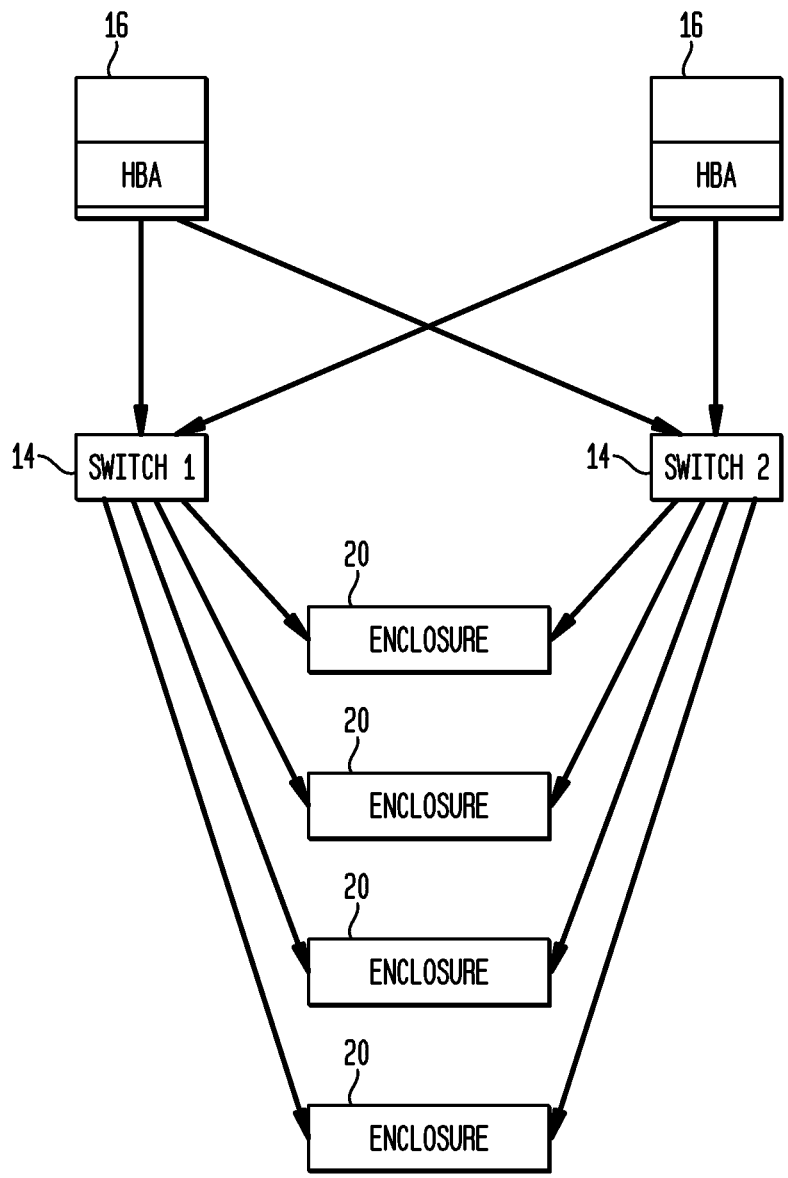
FIG. 4 is a block diagram of a fourth embodiment of a network incorporating enclosures with built-in expanders and 100 disk drives.
Figure 5:
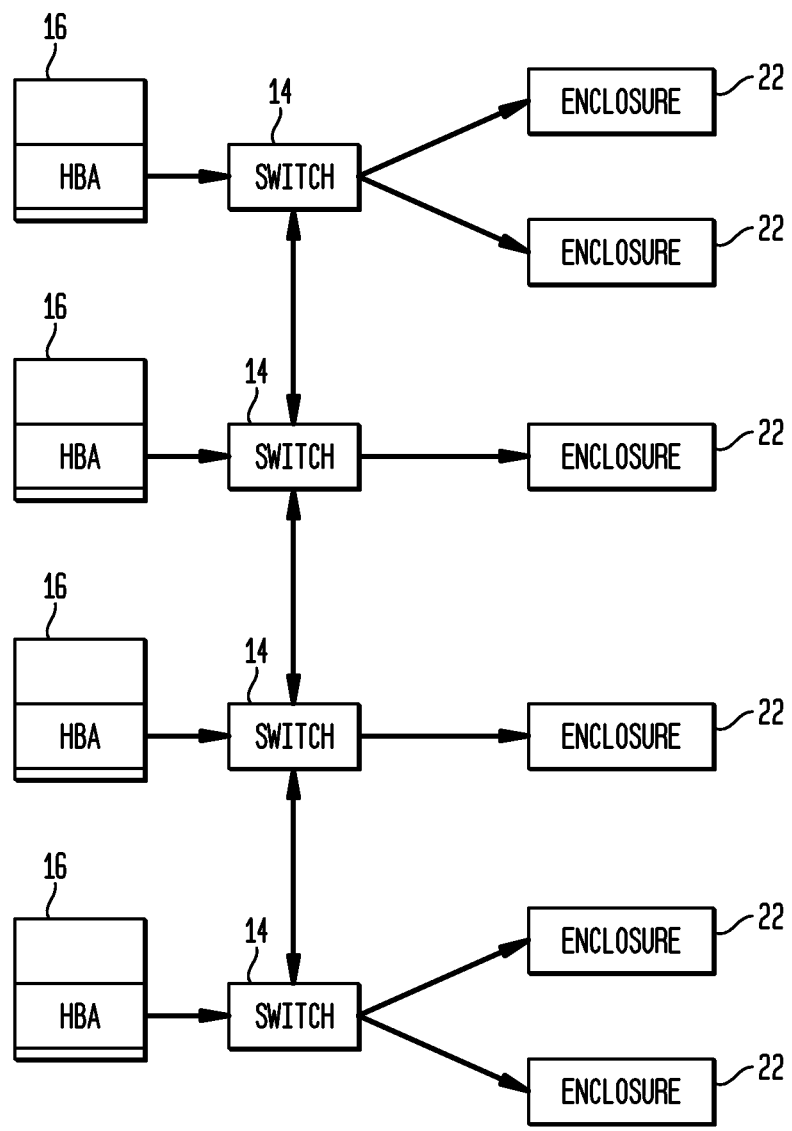
FIG. 5 is a block diagram of a fifth embodiment of a network incorporating enclosures with built-in expanders and 150 disk drives.
Figure 6:
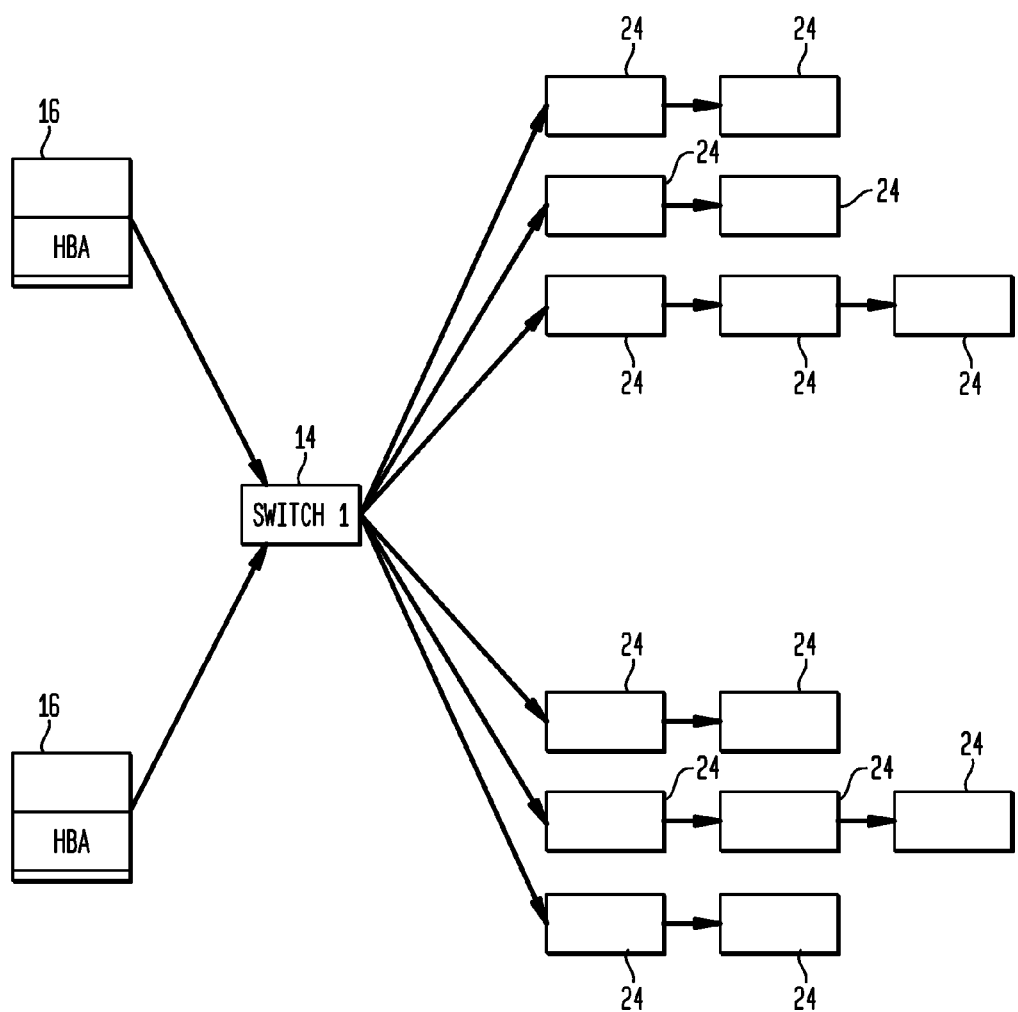
FIG. 6 is a block diagram of a sixth embodiment of a network incorporating 300 disk drives.
Figure 7:
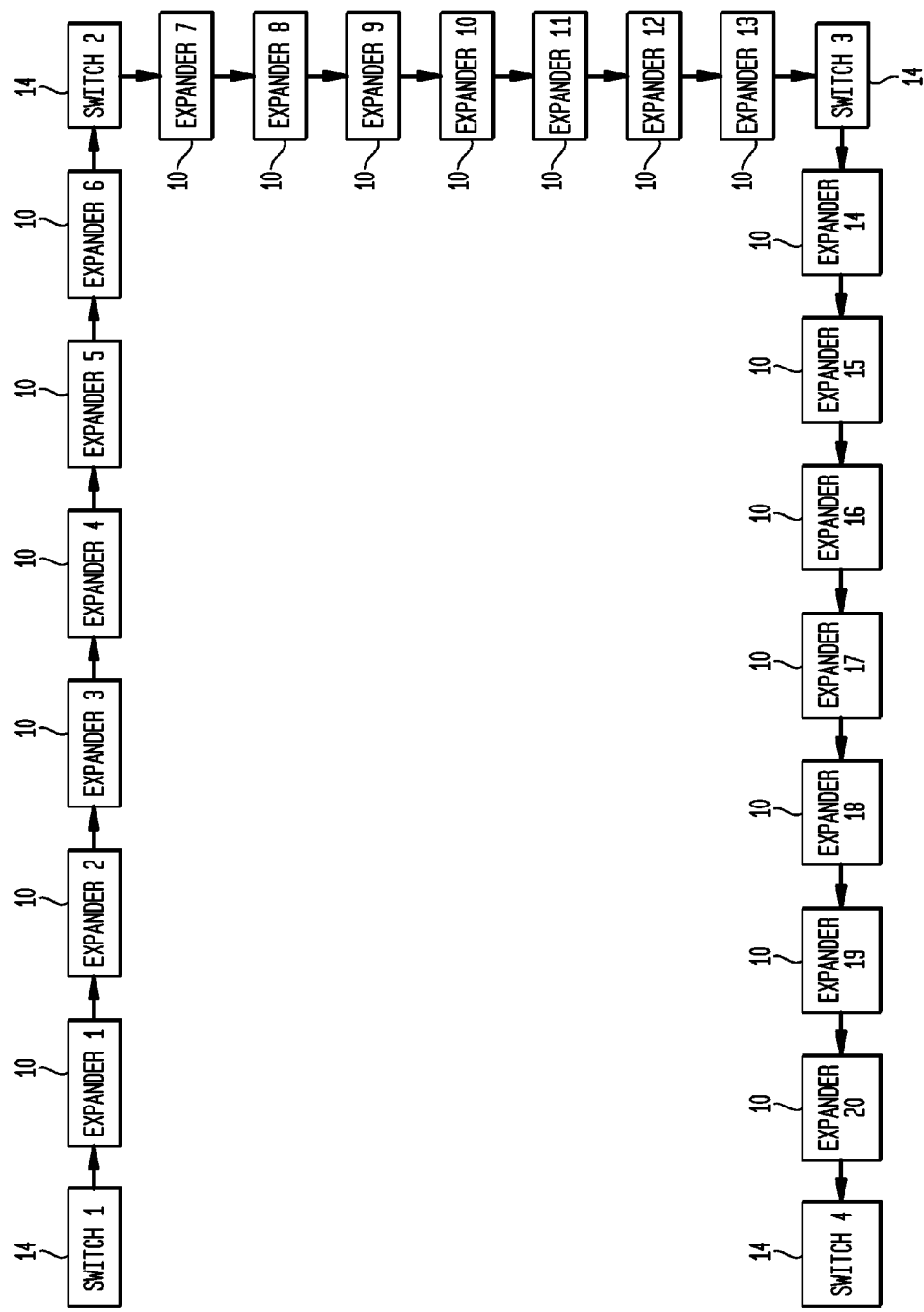
FIG. 7 is a block diagram of a seventh embodiment of a network incorporating expanders in a 24-deep configuration.
Figure 8:
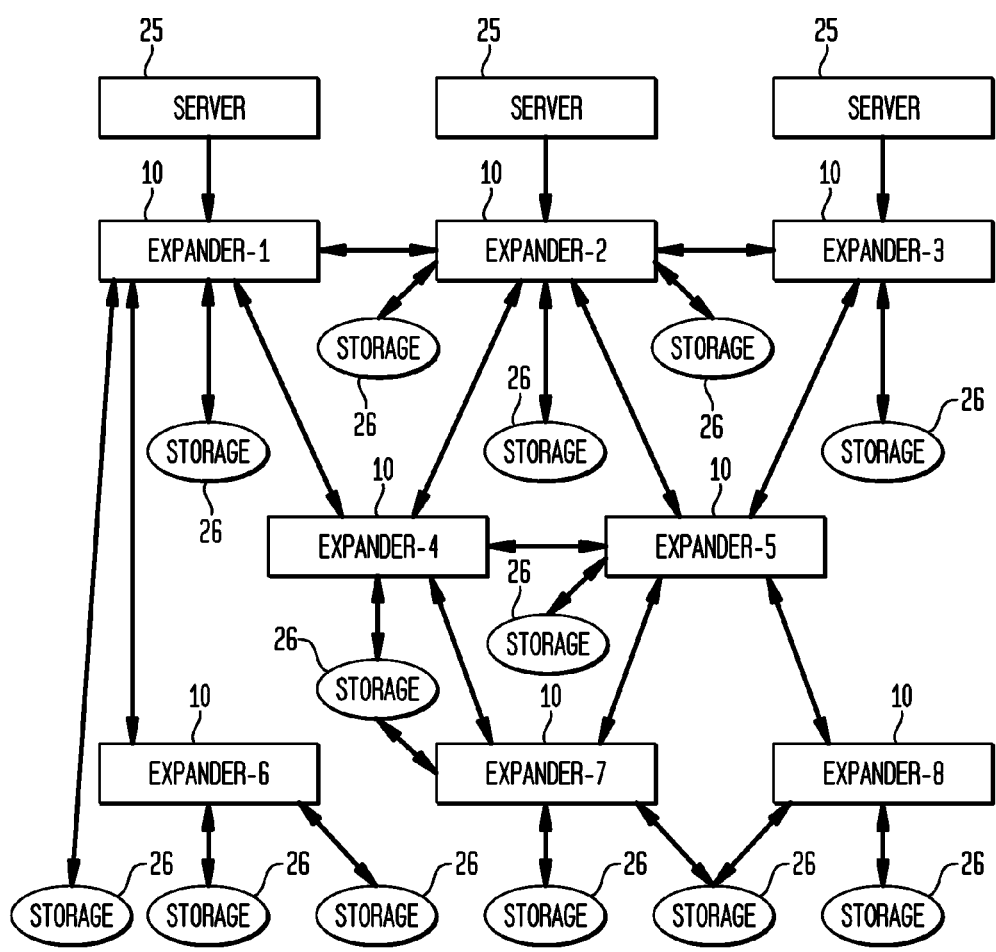
FIG. 8 is a block diagram of an eighth embodiment of a network incorporating expanders.

FIG. 3 is a block diagram showing at least a portion of an exemplary network including enclosures 18 with built-in expanders (not shown) and disk drives (not shown), according to a third embodiment of the invention. FIG. 4 is a block diagram depicting at least a portion of an exemplary network including enclosures 20 with built-in expanders (not shown) and disk drives (not shown), according to a fourth embodiment of the invention. FIG. 5 is a block diagram depicting at least a portion of an exemplary network including enclosures 22 with built-in expanders (not shown) and disk drives (not shown), according to a fifth embodiment of the invention. FIG. 6 is a block diagram depicting at least a portion of an exemplary network including disk drives 24, according to a sixth embodiment of the invention. FIG. 7 is a block diagram showing at least a portion of an exemplary network including expanders 10 in a 24-deep configuration, according to a seventh embodiment of the invention. FIG. 8 is a block diagram depicting at least a portion of an exemplary network including expanders 10, servers 25, and storage systems 26, according to an eighth embodiment of the invention.

In FIGS. 1 through 6, the hard disk drives 12 incorporate 3 Gbps/6 Gbps SATA/SAS drives and the remaining components incorporate HBase firmware/drivers and expander firmware. HBase is an open source, non-relational, distributed database written in Java, and provides a fault-tolerant method of storing large quantities of sparse data. In FIGS. 7 and 8, the hard disk drives incorporate 3G/6G SATA/SAS drives, the expanders 10 incorporate base and premium software development kit (SDK) firmware, and the remaining components incorporate HBase firmware/drivers and expander firmware. SDK represents a set of software development tools that allows for the creation of applications for a certain software package, software framework, hardware platform, computer system, video game, operating system, or other platform.

In a first embodiment of a method, one or more individual expanders in a network automatically detect a condition in which at least one other expander in the network is operating with a version of firmware that is different from that associated with the detecting expander or expanders. If so, the detecting expander automatically loads itself with a designated firmware version without requiring external management applications or user intervention. This results in a substantial increase in the speed at which the network is upgraded. In this way, designated expanders that are connected or cascaded together are ensured of operation with the same firmware version.

Figure 9:
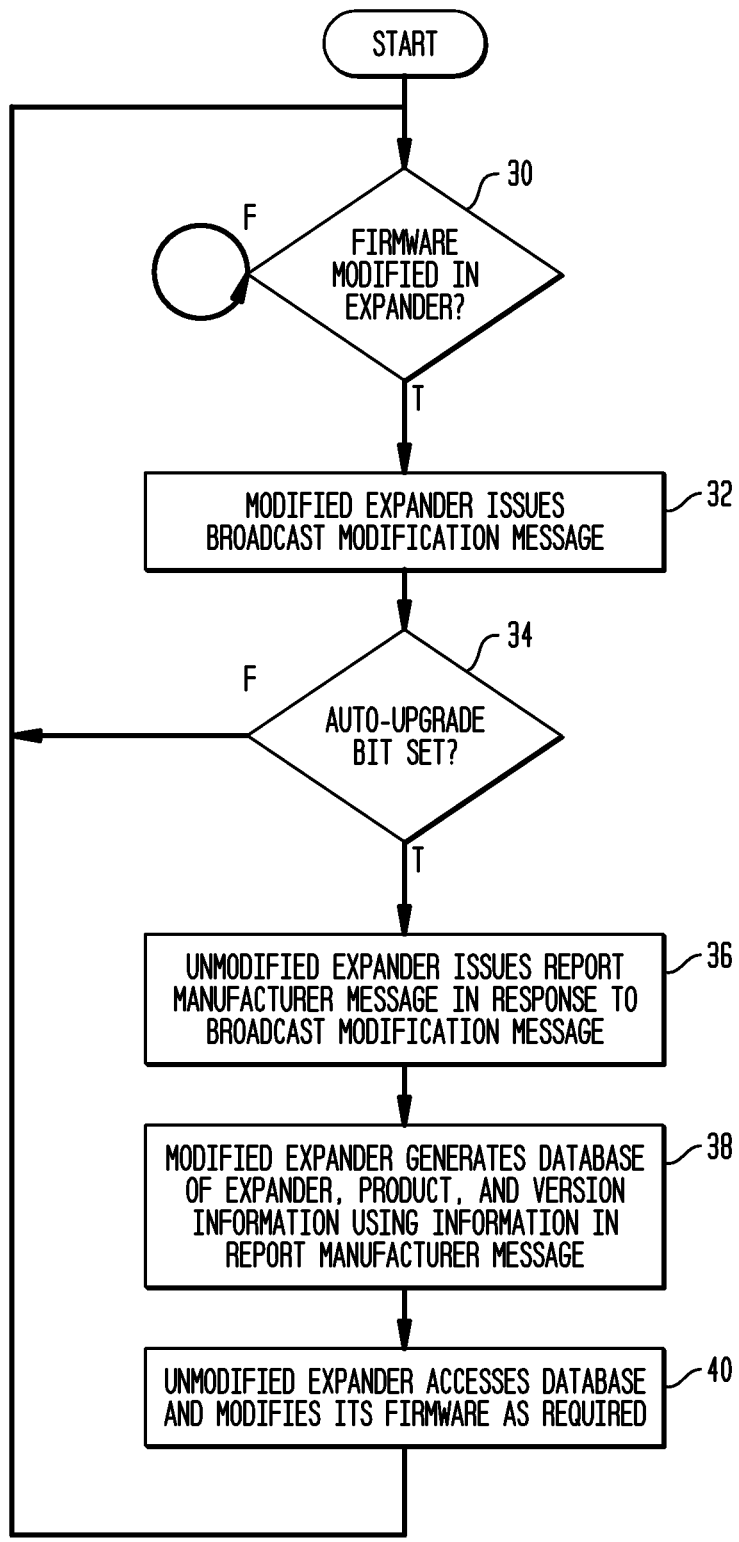
FIG. 9 is a flowchart of a first embodiment of a method to accelerate firmware modifications in a computer network.

FIG. 9 is a flowchart depicting at least a portion of an exemplary method for performing software modifications to devices associated with a computer network, according to an embodiment of the invention. Assuming, for example, a network topology as shown in FIG. 8, upon modifying the firmware version associated with an expander in step 30, the modified expander issues a broadcast modification message in step 32. The routine remains in step 30 as long as the firmware version in the expander has not been modified. If an auto_upgrade bit, or alternative identifier, is determined in step 34 to be set (T) in at least one of the remaining expanders in the network, which has the same type, manufacturer and/or model number as the modified expander, as represented, for example, by product identification information, that remaining expander responds with a report manufacturer message in step 36.

The modified expander generates a database in step 38 that, for example, includes expander identification, product identification, and firmware version information, as shown by way of illustration only in Table 1 below.

TABLE 1

| Expander Identification | Product Identification | Firmware Version |
|---|---|---|
| Expander-1 | x12 | 00.99.8.7.5 |
| Expander-2 | x12 | 00.99.8.7.6 |
| Expander-3 | y28 | 00.99.8.7.4 |

At least a subset of the remaining expanders in the network access the database and modify their firmware version in step 40. For example, any or all remaining expanders having the same product identification information as the expander modified in step 30 perform a firmware version modification. If the auto_upgrade bit is determined not to be set (F) in step 34, the routine proceeds to wait for another firmware version modification in an expander in step 30. The exemplary methodology of FIG. 9 does not require manual or user intervention following modification of the initial expander, and is thus faster than a second embodiment of the methodology discussed in further detail below.

As the quantity of expanders in the network that have been modified or seeded with a new firmware version increases in the first embodiment, the remaining expanders are able to download firmware in parallel. Therefore, the time to perform firmware upgrades of the network in accordance with the first embodiment is on the order of $\log_{base} N$, where N represents a total quantity of expanders in the network and the base represents a total quantity of simultaneous firmware downloads that can occur in the network. For example, if the base is equal to 2, then the time required to upgrade 16 expanders is given by the following equation:

$$\log_2 16 = 4 \quad (1)$$

which indicates that the time required to upgrade 16 expanders using the first embodiment will take only as much time as that required to upgrade four expanders.

In the first embodiment of the method shown in FIG. 9, the auto_upgrade bit is incorporated in a status word associated with any or all of the expanders. If the auto_upgrade bit is set to 1, the corresponding expander will transmit the report manufacturer message in response to receiving the broadcast modification message. In this way, undesirable, non-required, or unauthorized firmware upgrades are beneficially avoided. Alternatively, any or all of the remaining expanders perform a firmware version modification regardless of whether their product identification information is the same as that of the expander modified in step 30. As another alternative, the auto_upgrade bit is omitted or disregarded.

Figure 10:
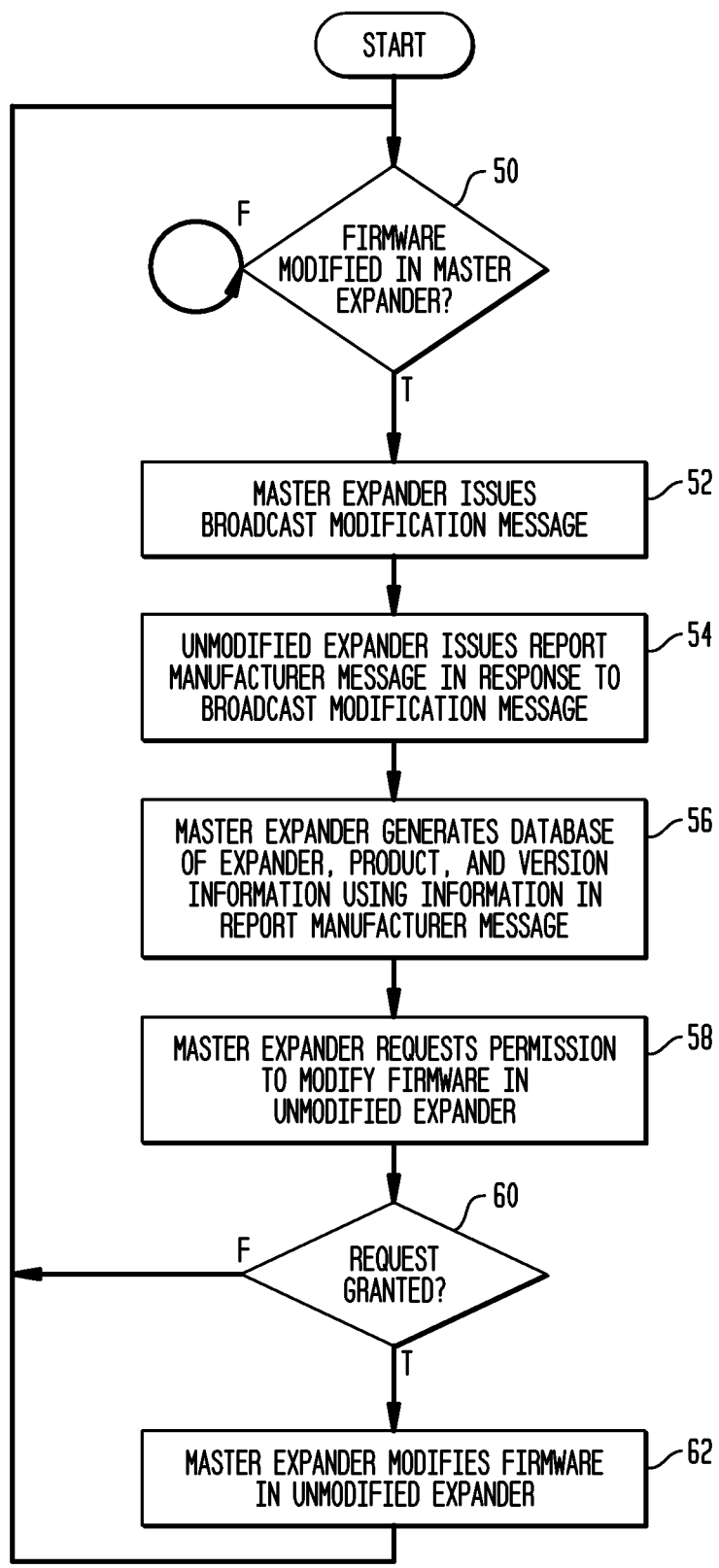
FIG. 10 is a flowchart of a second embodiment of a method to accelerate firmware modifications in a computer network.

FIG. 10 is a flowchart depicting at least a portion of an exemplary method for performing software modifications to devices associated with a computer network in which at least one expander is designated as a master expander, according to another embodiment of the invention. The master expander obtains and maintains an inventory of firmware versions associated with expanders in the network and coordinates downloads of firmware versions to selected expanders. Assuming the illustrative topography shown in FIG. 8, in response to a firmware upgrade that is, for example, recommended by a hardware vendor, the system administrator modifies the firmware version associated with the master expander in step 50 using any suggested method, such as trivial file transfer protocol (TFTP), in-band, or the like.

TFTP is an Internet software utility for transferring files that is simpler to use than file transfer protocol (FTP) and has fewer features. TFTP is used where user authentication and directory visibility are not required. TFTP uses user datagram protocol (UDP) rather than transmission control protocol (TCP). In-band transfers refer to when data and control signals are transmitted within the same channel or frequency, such as when an analog modem transmits control signals and data in the same frequency band.

Upon successful completion of the firmware version modification in the master expander in step 50, the master expander transmits a broadcast modification message to other expanders in the network or domain in step 52. The broadcast modification message requests the firmware version currently associated with the remaining expanders. The remaining expanders transmit a report manufacturer message in step 54 in response to the broadcast modification message. The master expander uses these responses to generate and maintain a database of information in step 56, which is, for example, represented as shown in Table 1 above. In an illustrative embodiment, the database includes at least one of expander identification, product identification, and firmware version information associated with expanders in the network.

The master expander requests permission to modify firmware in the unmodified expander in step 58 by, for example, issuing an exception or trap, such as a simple network management protocol (SNMP) trap, which communicates the firmware upgrade to expanders having the same product identification. Alternatively, the system administrator verifies product identification information using a management tool. As another alternative, the network administrator confirms that an upgrade is to be performed in response to an administrator enable (AEN) message being transmitted by the master expander. In this way, the master expander is able to initiate firmware upgrades on expanders having the same product identification based on confirmation from the network administrator.

If the request to modify is granted (T) in step 60, the master expander proceeds to modify the firmware version associated with the unmodified expander in step 62. If the request is not granted (F) in step 60, the method proceeds to wait for another firmware modification in the master expander in step 50. Steps 58 and 60 are optional, omitted, and/or disregarded if an upgrade policy associated with the network is set to allow upgrades to expanders.

SNMP is a widely used network monitoring and control protocol. Data are passed from SNMP agents, which are hardware and/or software processes reporting activity in each network device, such as a hub, router, bridge, and the like, to a workstation console used to oversee the network. The agents return information contained in a management information base (MIB), which is a data structure that defines what is obtainable from the device and what can be controlled. SNMP has become widely used on most major platforms.

From an industry point of view, new firmware version releases create substantial overhead for administrators seeking to upgrade designated expanders that are connected together to increase overall storage capacity in data centers. However, embodiments of the invention described herein provide a method that significantly reduces the time and level of user intervention required to perform these upgrades.

In addition to the features discussed above, embodiments of the invention incorporate and can be used in conjunction with any or all of the following while remaining within the intended scope:

1. upgrades, downgrades, and/or any modifications to software;
2. wired and wireless networks;
3. software, firmware, assembly code, and machine code, wherein software is used herein to refer to any or all of the aforementioned instruction formats;
4. any and all network protocols;
5. any network device or resource including, but not limited to, network switches, routers, gateways, and storage switches; and
6. steps of the embodiments are capable of being performed in any order.

Figure 11:
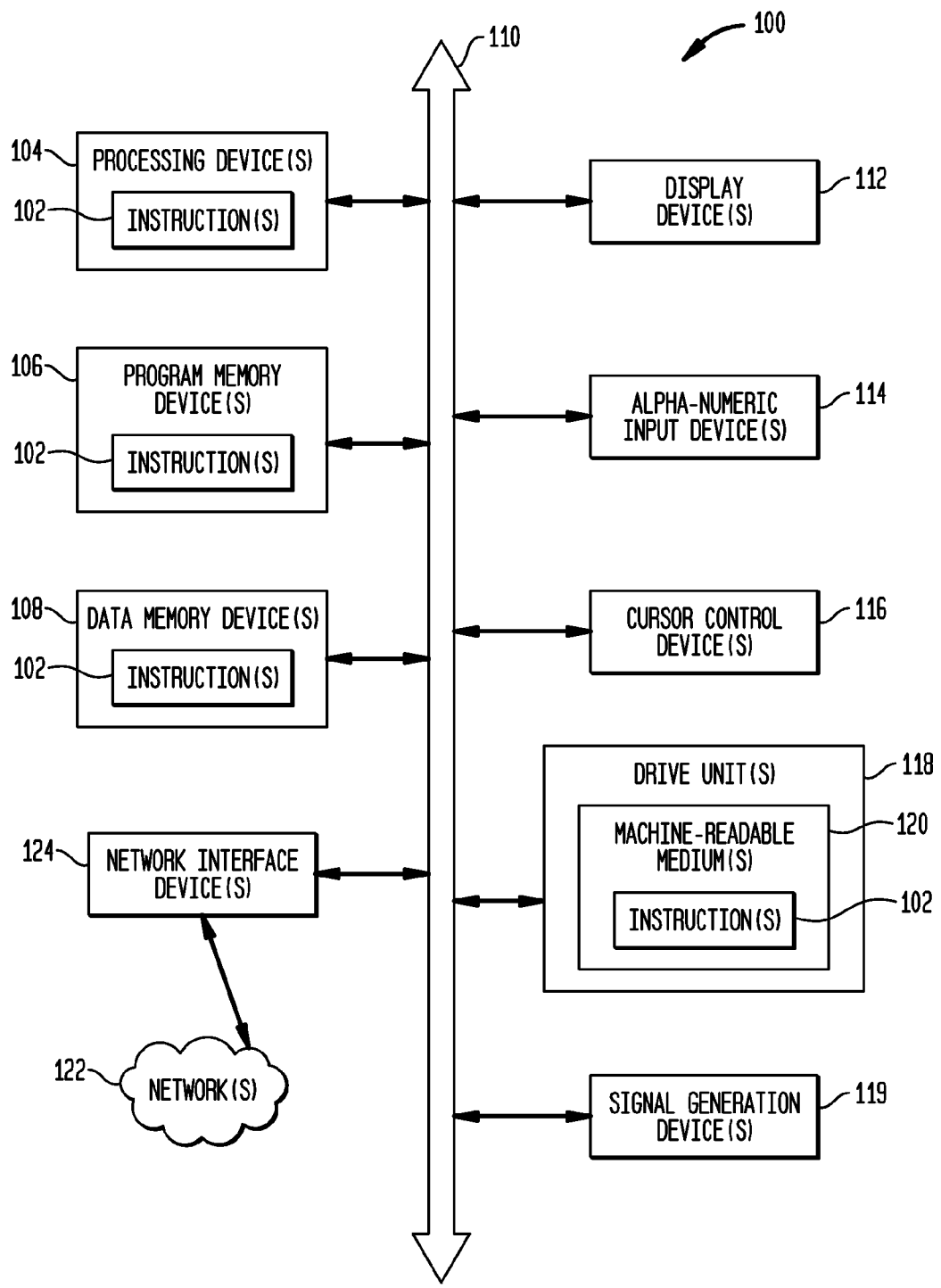
FIG. 11 is a block diagram showing at least a portion of an exemplary machine in the form of a computing system configured to perform methods according to one or more embodiments.

FIG. 11 is a block diagram of an embodiment of a machine in the form of a computing system 100, within which is a set of instructions 102 that, when executed, cause the machine to perform any one or more of the methodologies according to embodiments of the invention. In some embodiments, the machine operates as a standalone device. In some embodiments, the machine is connected (e.g., via a network 122) to other machines. In a networked implementation, the machine operates in the capacity of a server or a client user machine in a server-client user network environment. Exemplary implementations of the machine as contemplated by the invention include, but are not limited to, a server computer, client user computer, personal computer (PC), tablet PC, Personal Digital Assistant (PDA), cellular telephone, mobile device, palmtop computer, laptop computer, desktop computer, communication device, personal trusted device, web appliance, network router, switch or bridge, or any machine capable of executing a set of instructions (sequential or otherwise) that specify actions to be taken by that machine.

The computing system 100 includes a processing device(s) 104 (e.g., a central processing unit (CPU), a graphics processing unit (GPU), or both), program memory device(s) 106, and data memory device(s) 108, which communicate with each other via a bus 110. The computing system 100 further includes display device(s) 112 (e.g., liquid crystals display (LCD), flat panel, solid state display, or cathode ray tube (CRT)). The computing system 100 includes input device(s) 114 (e.g., a keyboard), cursor control device(s) 116 (e.g., a mouse), disk drive unit(s) 118, signal generation device(s) 120 (e.g., a speaker or remote control), and network interface device(s) 124, operatively coupled together, and/or with other functional blocks, via bus 110.

The disk drive unit(s) 118 includes machine-readable medium(s) 120, on which is stored one or more sets of instructions 102 (e.g., software) embodying any one or more of the methodologies or functions herein, including those methods illustrated herein. The instructions 102 also reside, completely or at least partially, within the program memory device(s) 106, the data memory device(s) 108, and/or the processing device(s) 104 during execution thereof by the computing system 100. The program memory device(s) 106 and the processing device(s) 104 also constitute machine-readable media. Dedicated hardware implementations, such as but not limited to application specific integrated circuits, programmable logic arrays, and other hardware devices can likewise be constructed to implement the methods described herein. Applications that include the apparatus and systems of various embodiments broadly comprise a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments, the methods, functions or logic described herein is implemented as one or more software programs running on a computer processor. Dedicated hardware implementations including, but not limited to, application specific integrated circuits, programmable logic arrays and other hardware devices can likewise be constructed to implement the methods described herein. Further, alternative software implementations including, but not limited to, distributed processing or component/object distributed processing, parallel processing, or virtual machine processing can also be constructed to implement the methods, functions or logic described herein.

The embodiment contemplates a machine-readable medium or computer-readable medium containing instructions 102, or that which receives and executes instructions 102 from a propagated signal so that a device connected to a network environment 122 can send or receive voice, video or data, and to communicate over the network 122 using the instructions 102. The instructions 102 are further transmitted or received over the network 122 via the network interface device(s) 124. The machine-readable medium also contains a data structure for storing data useful in providing a functional relationship between the data and a machine or computer in an illustrative embodiment of the systems and methods herein.

While the machine-readable medium 102 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform anyone or more of the methodologies of the embodiment. The term "machine-readable medium" shall accordingly be taken to include: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the embodiment is considered to include anyone or more of a tangible machine-readable medium or a tangible distribution medium, as listed herein and including art-recognized equivalents and successor media, in which the software implementations herein are stored.

It should also be noted that software, which implements the methods, functions or logic herein, are optionally stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the disclosure is considered to include a tangible storage medium or distribution medium as listed herein and other equivalents and successor media, in which the software implementations herein are stored.

As previously stated, although the specification describes components and functions implemented in accordance with embodiments of the invention with reference to particular standards and protocols, the embodiments are not limited to such standards and protocols.

The illustrations of embodiments of the invention described herein are intended to provide a general understanding of the structure of the various embodiments, and they are not intended to serve as a complete description of all the elements and features of apparatus and systems that might make use of the structures described herein. Many other embodiments will become apparent to those of skill in the art given the teachings herein. Other embodiments are utilized and derived therefrom, such that structural and logical substitutions and changes are made without departing from the scope of this disclosure. Figures are also merely representational and are not necessarily drawn to scale. Certain proportions thereof may be exaggerated, while others diminished in order to facilitate an explanation of the embodiments of the invention. Accordingly, the specification and drawings are to be regarded in an illustrative rather than a restrictive sense.

Such embodiments of the inventive subject matter are referred to herein, individually and/or collectively, by the term "embodiment" merely for convenience and without intending to voluntarily limit the scope of this application to any single embodiment or inventive concept if more than one is in fact shown. Thus, although specific embodiments have been illustrated and described herein, it should be appreciated that any arrangement calculated to achieve the same purpose are substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single embodiment. Thus the following claims are hereby incorporated into the Detailed Description, with each claim standing on its own as a separate example embodiment.

The Abstract is provided to comply with 37 C.F.R. §1.72 (b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single embodiment. Thus the following claims are hereby incorporated into the Detailed Description, with each claim standing on its own as separately claimed subject matter.

Although specific example embodiments have been described, it will be evident that various modifications and changes are made to these embodiments without departing from the broader scope of the inventive subject matter described herein. Accordingly, the specification and drawings are to be regarded in an illustrative rather than a restrictive sense. The accompanying drawings that form a part hereof, show by way of illustration, and without limitation, specific embodiments in which the subject matter are practiced. The embodiments illustrated are described in sufficient detail to enable those skilled in the art to practice the teachings herein. Other embodiments are utilized and derived therefrom, such that structural and logical substitutions and changes are made without departing from the scope of this disclosure. This Detailed Description, therefore, is not to be taken in a limiting sense, and the scope of various embodiments is defined only by the appended claims, along with the full range of equivalents to which such claims are entitled.

Given the teachings of the invention provided herein, one of ordinary skill in the art will be able to contemplate other implementations and applications of the techniques of the invention. Although illustrative embodiments of the invention have been described herein with reference to the accompanying drawings, it is to be understood that the invention is not limited to those precise embodiments, and that various other changes and modifications are made therein by one skilled in the art without departing from the scope of the appended claims.

What is claimed is:

1. A method of modifying software stored by network devices, the method comprising:
    transmitting a modification message by a first network device in response to software executed by the first network device being modified, the first network device identified by a first product identifier;
    transmitting second software identification information by a second network device in response to receiving the modification message from the first network device, the second software identification information identifying software executed by the second network device, the second network device identified by a second product identifier;
    providing a database comprising the first product identifier, the second product identifier, first software identification information, and the second software identification information received from the second network device, the first software identification information identifying software stored by the first network device;
    modifying the software executed by the second network device according to the first software identification information of the database; and
    maintaining the database at the first network device, wherein the first network device is a master network device for at least one connected network device, including the second network device, having a same product identifier as the first network device, and wherein modifying the software executed by the second network device is performed by the first network device.

2. The method defined by claim 1, wherein the first product identifier comprises at least one of network device identification information, manufacturer information, and model information associated with the first product identifier, the second product identifier comprising at least one of network device identification information, manufacturer information, and model information associated with the second product identifier.

3. The method defined by claim 1, further comprising verifying that the first product identifier is the same as the second product identifier.

4. The method defined by claim 1, wherein at least one of the software executed by the first network device and the software executed by the second network device comprises at least one of firmware, assembly code, and machine code.

5. The method defined by claim 1, wherein the first network device is a master network device, modifying the software executed by the second network device being performed by the first network device in response to a request for modification of the software associated with the second network device being granted.

6. A non-transitory computer-readable medium storing instructions that, when executed by a processing device, perform a method of modifying software executed by network devices, the method comprising:
    transmitting second software identification information by a second network device in response to receiving a modification message from a first network device indicating that software executed the first network device has been modified, the second software identification information identifying software executed by the second network device, the second network device identified by a second product identifier, and the first network device identified by a first product identifier;
    modifying the software executed by the second network device according to the first software identification information stored in a database, the database comprising the first product identifier, the second product identifier, first software identification information, and the second software identification information received from the second network device, the first software identification information identifying the software executed by the first network device; and maintaining the database at the first network device, wherein the first network device is a master network device, for at least one connected network device, including the second network device, having a same product identifier as the first network device, and wherein modifying the software executed by the second network device is performed by the first network device.

7. The computer-readable medium defined by claim 6, wherein the first product identifier comprises at least one of network device identification information, manufacturer information, and model information associated with the first product identifier, the second product identifier comprising at least one of network device identification information, manufacturer information, and model information associated with the second product identifier.

8. The computer-readable medium defined by claim 6, further comprising verifying that the first product identifier is the same as the second product identifier.

9. The computer-readable medium defined by claim 6, wherein at least one of the software executed by the first network device and the software executed by the second network device comprises at least one of firmware, assembly code, and machine code.

10. The computer-readable medium defined by claim 6, wherein the first network device is a master network device, modifying the software executed by the second network device being performed by the first network device in response to a request for modification of the software associated with the second network device being granted.

11. A system of connected network devices, the system comprising:

a first network device transmitting a modification message in response to software executed by the first network device being modified, the first network device identified by a first product identifier; and a second network device transmitting second software identification information in response to receiving the modification message from the first network device, the second software identification information identifying software executed by the second network device, the second network device identified by a second product identifier, the first network device comprising a database stored on a non-transitory computer-readable medium, the database comprising the first product identifier, the second product identifier, first software identification information, and the second software identification information, the first software identification information identifying the software executed by the first network device, the software executed by the second network device being modified according to the first software identification information of the database;

wherein the first network device is a master network device, for at least one connected network device, including the second network device, having a same product identifier as the first network device, wherein the database is maintained at the first network device, and wherein the software executed by the second network device being modified by the first network device.

12. The system defined by claim 11, wherein the first product identifier comprises at least one of network device identification information, manufacturer information, and model information associated with the first product identifier, the second product identifier comprising at least one of network device identification information, manufacturer information, and model information associated with the second product identifier.

13. The system defined by claim 11, wherein the first product identifier is the same as the second product identifier.

14. The system defined by claim 11, wherein at least one of the first network device and second network device comprises at least one of an expander, network switch, router, gateway, and storage switch.

15. The system defined by claim 11, wherein at least one of the software executed by the first network device and the software executed by the second network device comprises at least one of firmware, assembly code, and machine code.

16. The system defined by claim 11, wherein the second network device transmits the second software identification information based on an auto-upgrade bit of the second network device.

17. The system defined by claim 11, wherein the software executed by the second network device is modified using the database based on an auto-upgrade bit of the second network device.

18. The system defined by claim 11, wherein the first network device is a master network device, the software executed by the second network device being modified by the first network device in response to a request for modification of the software executed by the second network device being granted.

* * * * *